April 16, 1957 S. F. VARIAN ET AL 2,789,250
HIGH FREQUENCY DEVICE
Filed July 30, 1952 2 Sheets-Sheet 2

INVENTORS
SIGURD F. VARIAN
DONALD L. SNOW
BY
ATTORNEY

United States Patent Office 2,789,250
Patented Apr. 16, 1957

2,789,250

HIGH FREQUENCY DEVICE

Sigurd F. Varian, Menlo Park, and Donald L. Snow, Palo Alto, Calif., assignors to Varian Associates, San Carlos, Calif., a corporation of California Application July 30, 1952, Serial No. 301,628

10 Claims. (Cl. 315—5.21)

This invention relates, generally, to ultra high frequency electron tube apparatus and the invention has reference, more particularly, to a structurally and operatively improved velocity modulation type electron discharge tube employing a cavity resonator or resonators.

Ultra high frequency devices of the velocity modulation type employing cavity resonators are being widely used as oscillators, amplifiers, modulators, frequency multipliers, etc., and in general fall into two general classifications with respect to their cavity resonators. One such general class are those devices wherein the cavity resonator or resonators are internal, that is, the structures forming the cavity resonators are entirely within the vacuum envelope of the tube or the boundary walls of the cavity resonators constitute a part of the vacuum envelope. These prior internal cavity resonator devices generally have utilized mechanical or thermal tuning devices positioned exterior to the vacuum envelope of the tube, which tuning devices employ complex mechanical devices for moving the elements of the tube within the vacuum envelope, such as the resonator grids and walls of the cavity, for tuning purposes. These external tuning devices have been necessarily large in comparison with the size of the tube itself and have oftentimes been delicate mechanisms easily subject to derangement.

The second such general class of devices are those wherein the cavity resonator or resonators are partly external to the vacuum envelope of the tube. An example of such a tube is the "disk-seal" type tube where the resonator grids are supported by parallel metal disks between which is located a glass tubing sealed to the disks. The glass tubing forms a part of the tube vacuum envelope as well as a part of the structural body of the tube, and the outer walls of the external cavity resonator encircle this section of the tube and connect with the disks. Because this portion of the tube body is a band of glass completely encircling the body and sealed to metal, the tube structure is necessarily fragile at this point, much more so than a tube in which the complete body structure is metal. The advantage of such an external cavity tube lies in the fact that a large portion of the cavity resonator is separable from the main body of the tube and therefore easily replaceable and also the size of the cavity is more easily adjusted for frequency tuning by less complex tuning mechanisms.

It is, therefore, a principal object of this invention to provide a simple, extremely rugged and highly efficient electron beam velocity modulation tube of the type wherein a tunable resonant cavity portion thereof is external to the vacuum envelope of the tube and is heavily coupled to the internal resonant circuit of the velocity modulation tube.

Another object of this invention is to provide an electron beam velocity modulation tube of the type wherein one cavity resonator or portion thereof is external to the vacuum envelope of the main body of the tube which includes an internal cavity resonator coupled to the external cavity resonator, the tube being readily tunable by use of simple means in the external cavity resonator, the vacuum envelope and body of the tube being substantially entirely metallic and hence rugged and dependable in use.

A further object of this invention is to provide an electron beam velocity modulation tube wherein an internal resonator cavity portion or chamber is iris-coupled to an external resonator cavity portion or chamber.

Still another object of the present invention is to provide a velocity modulation tube wherein a cavity resonator within the vacuum envelope is heavily coupled through an iris opening to a cavity resonator outside the vacuum envelope, a metallic member being positioned closely adjacent the iris window and serving to load the window to produce the optimum coupling between the two cavity resonators.

A further object of this invention is to provide an electron beam velocity modulation tube wherein a rigid all metal evacuated integral resonator cavity is iris-coupled to a non-evacuated external substantially all metal tunable resonator cavity, the construction of said tube being such that good heat conductivity from the grids of the tube is provided, thereby enabling relatively heavy beam currents to be employed without burning out the grids or effecting appreciable undesired frequency shifts due to changes in the tube output.

A further object of this invention is to provide an electron beam velocity modulated tube wherein a substantially entirely metallic evacuated internal resonator cavity is included within the vacuum envelope of the tube and wherein such internal resonator cavity is iris-coupled to an external resonator cavity which is removable from the tube and replaceable by other external resonator cavities, the tube being tunable in steps by changing the external resonator cavities.

Other objects and advantages will become apparent from perusal of the following specification taken in connection with the accompanying drawings wherein one embodiment of the invention is depicted.

Figure 1:
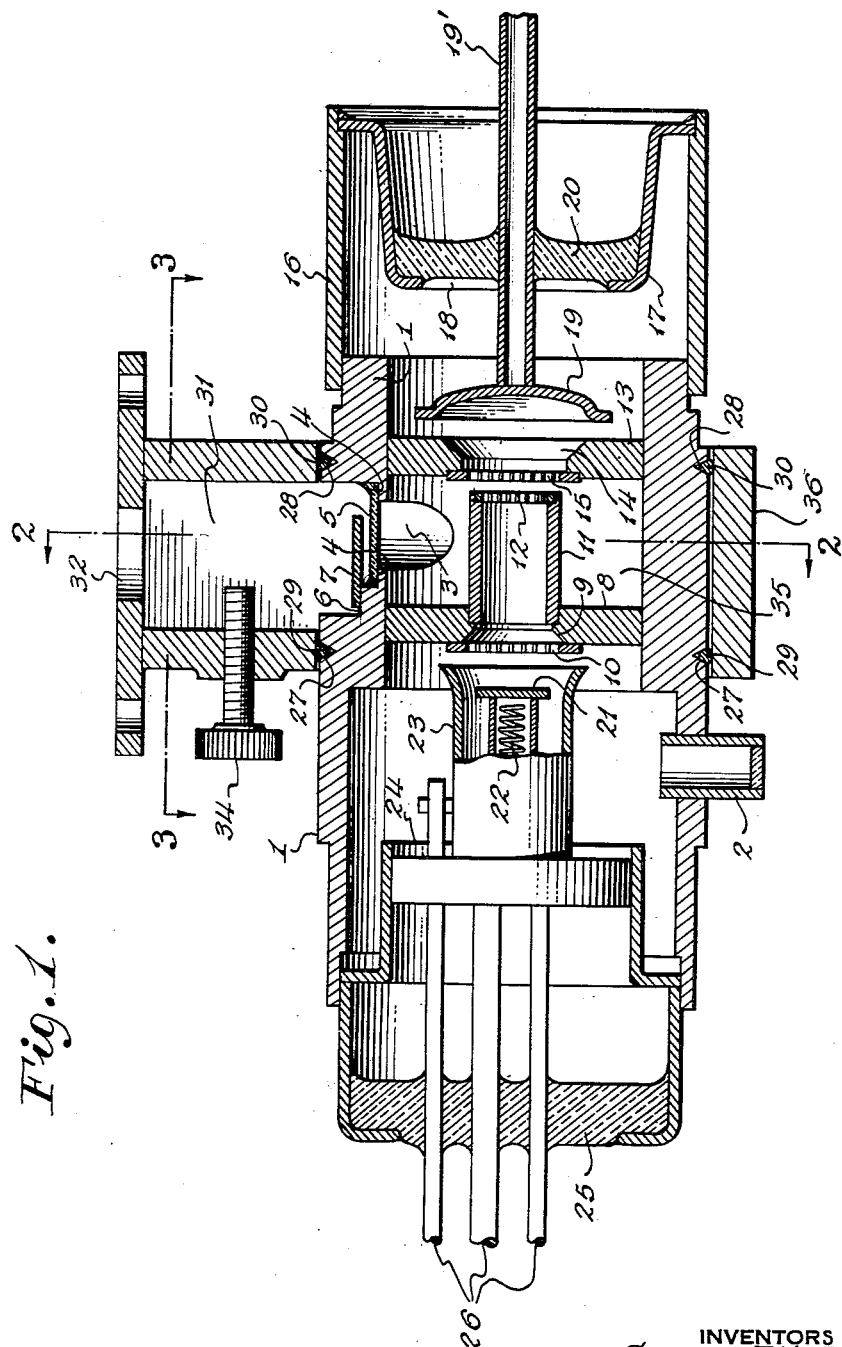
Fig. 1 is a longitudinal sectional view of a reflex klystron embodying the invention, a portion of the electron gun assembly being shown in side elevation.
Figure 2:
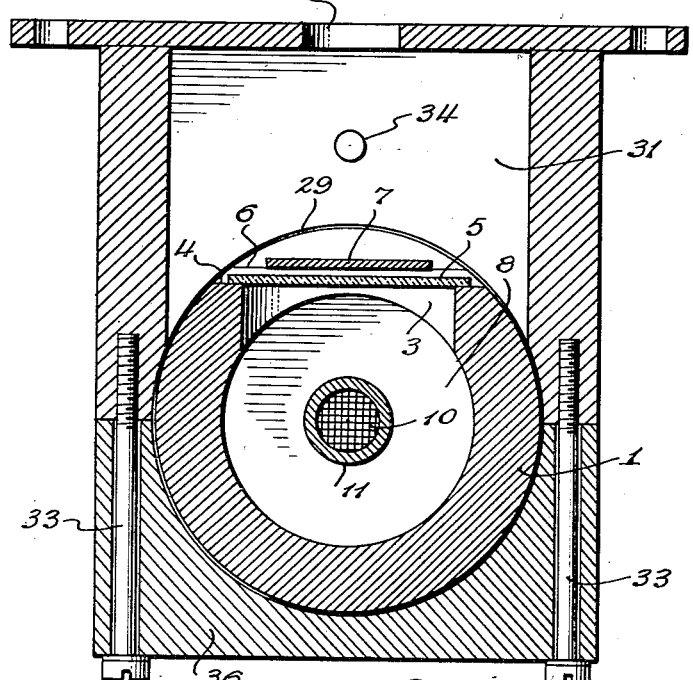
Fig. 2 is a transverse sectional view of the tube in a plane indicated by section line 2—2 in Fig. 1, the arrows indicating the direction in which the view is taken.
Figure 3:
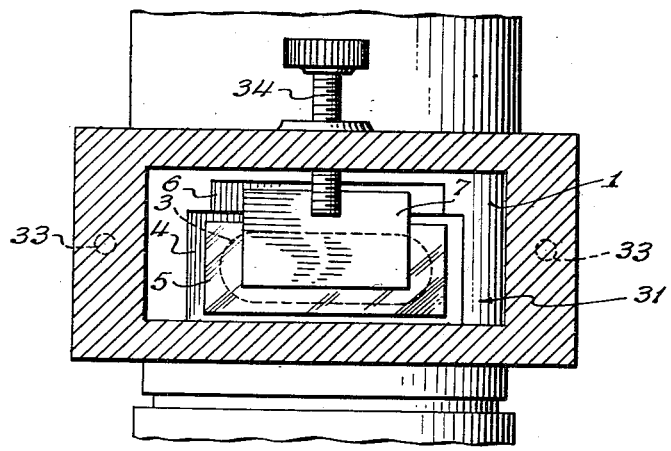
Fig. 3 is a plan view of a portion of the tube looking at the iris-coupling window in the tube through the part of the external cavity resonator from section line 3—3 in Fig. 1, the arrows indicating the direction of the view.

Referring to the drawings, the main body 1 of the reflex klystron is metallic and has a hollow cylindrical shape, the inside bore of the body having three portions of differing diameters arranged in step-like relationship. The outside surface is turned down slightly at both ends. Extending through the wall of the body 1 is an exhaust opening in which a metallic exhaust tube 2 is tightly fitted and sealed to the body and through which the tube is evacuated, the outer end of exhaust tube 2 then being sealed. Located in that portion of the body 1 having the smallest inside diameter is an elongated opening 3 extending perpendicular to the longitudinal axis of the body. Cut into the body 1 and surrounding this opening is a small ledge 4 on which an elongated sheet of mica 5, cut to completely cover the opening 3, is fitted and sealed to the body 1. Extending outward from the opening 3 is a step 6 cut into the body on which is fixedly secured a metallic loading slug 7 which extends out over the mica covered opening or window 3.

Fixedly secured within the portion of body 1 having the smallest diameter at a point adjacent window 3 is a ring-shaped metallic header or wall 8 having an axially aligned bore 9 therein. Fixedly mounted on one side of this header 8 and axially aligned with the bore 9 therethrough is a round honeycombed metallic accelerating grid 10. Fixedly mounted on the opposite side of the cathode header 8 in a portion of the bore 9 therein is a cylindrical metal reentrant tube 11 open at both ends. Mounted securely on the inner end of this tube 11 is a round honeycombed resonator grid 12. Secured within the bore of the body 1 at a point adjacent the grid 12 is a ring-shaped metallic header or wall 13 having an axially aligned bore 14. Fixedly mounted on the header 13 on the side nearest to the resonator grid 12 is a second round honeycombed resonator grid 15, the header 13 being placed within the body 1 so that careful spacing of the two resonator grids 12 and 15 is maintained.

Shown mounted on the outside surface of the body 1 at one end thereof and sealed thereto is a cylindrical shaped metallic tube shell 16. Sealed within the end of the shell 16 is an inwardly directed metal cup 17 having an opening 18 in its base. Sealing the tube and also securely holding a reflector 19 by means of its stem 19' within the shell 16 is a glass-to-metal type seal 20 across the cup opening 18. Sealed to the other end of the tube body and extending into the bore of the body 1 is the cathode assembly or electron gun including the cathode button 21, heater 22, focusing ring 23, and supporting cup 24. A glass-to-metal type seal 25 closes this end of the tube and supports the tube leads 26.

Encircling the body 1 on the outside surface are shown two V-shaped grooves 27 and 28, one on either side of the window 3. Two soft metal rings 29 and 30 are fitted around the body in these two grooves 27 and 28. Fitted over the window opening 3 is a rectangular external cavity resonator or resonator portion 31, open at the end adjacent to the body 1 and closed at its other end except for a small circular aperture 32 therein. The external cavity resonator 31 is held in close contact with the body 1 by means of an U-shaped bracket 36 and screws 33, the two metal rings 29 and 30 being compressed between the end surfaces of the external cavity resonator 31 and bracket 36 and the body 1 and forming a tight mechanical and electrical seal. A simple tuning screw 34 is threaded into the external cavity resonator 31 through the side thereof. The rings 29 and 30 are compressed by the tightening of bracket 36 so as to snugly engage the surfaces of grooves 27 and 29 and the surrounding external cavity 31 throughout the circumference of the rings thereby providing a continuous low impedance contact between the external resonator portion 35 and the internal resonator portion 31. Merely by loosening screws 33 the bracket 36 can be retracted slightly from the body 1 enabling a worn out tube to be readily slipped out longitudinally from the bracket 36 and resonator portion 31 and a new tube inserted, whereupon the tightening of screws 33 again places the structure in condition for immediate use.

In operation, the electrons in a beam of electrons emitted from the cathode button 21 in the electron gun assembly are accelerated when passing through the positively charged accelerating grid 10 to a constant velocity. The electron beam traverses the space within the reentrant tube 11 and then passes through the space between the two resonator grids 12 and 15 which forms a part of the internal cavity resonator 35 of the tube. The remainder of the internal cavity resonator 35 is formed by the inside surfaces of the headers 8 and 13, the inside surface of a part of the body 1 and the outside surface of the tube 11, the window 3 being located in the wall of this internal cavity 35. The electromagnetic field within this internal cavity resonator 35 velocity modulates the beam as it passes through the resonator grids 12 and 15, the electrons in the beam being repulsed by the negatively charged reflector 19 and return back through the resonator grids 12 and 15 density modulated, i. e., in bunches, thus imparting energy to the internal cavity resonator 35. According to accepted theories, this operation excites and maintains an ultra-high frequency field interacting with the beam of electrons within the internal cavity resonator 35, the frequency of oscillation of the tube being determined in part by the dimensions of the internal cavity resonator 35, the external cavity resonator 31 and including the spacing of the resonator grids 12 and 15 and reflector 19, etc., as dictated by well known cavity resonator principles.

The window 3 provides a point of ingress and egress through which the internal cavity resonator or resonator portion 35 and external cavity resonator or resonator portion 31 are coupled and are permitted to interact in such manner that the frequency of oscillation of the tube is variable by means of the external cavity resonator 31 and the ultra-high frequency energy from the field within the internal cavity resonator 35 may pass to the external cavity resonator 31. The tube may be pretuned by proper dimensioning of the internal cavity resonator 35 and the electrode spacing therein, and further tuning of the tube may be accomplished by means of the properly dimensioned cavity resonator or portion 31 completely external to the vacuum envelope. The simple tuning screw or capacitive post 34 provided in the external cavity resonator 31 provides still finer tuning. The size of the window 3 in part determines the energy which passes from the internal cavity resonator 35 to the external cavity resonator 31, an increase in size causing an increase in the power output. The loading slug or iris loading member 7 placed across the opening 3 is used to increase the power without changing the size of the opening 3, the loading slug 7 producing the same effect as if the size of the window 3 had been enlarged. In this way, a large amount of power may be extracted through a relatively small opening in the internal cavity resonator.

The high frequency energy then passes from the external cavity resonator 31 to a well known type wave guide (not shown) coupled thereto through the small circular aperture 32 in the end wall of the external cavity resonator.

It should be noted that the fixed tuned cavity resonator inside the vacuum is coupled through a vacuum seal to a tunable cavity resonator, external to the vacuum. By means of the relatively large iris plus the iris loading member 7, the two cavities are electrically coupled together as tight or heavily as possible, that is, much more than the well-known critical coupling of resonance circuits. The internal cavity and the external cavity are directly coupled without any transmission line length between the two cavities. Since the use of the loading member 7 optimizes the heavy coupling between the internal and external resonant cavities, to thereby improve the characteristics of the tuning range, power output, bandwidth and modulation sensitivity, critical requirements on the size and shape of the iris window are lessened thus facilitating rapid construction of the klystron.

From the foregoing description and the drawings it can be seen that the main body or shell of the tube is metal, the metallic shell forming the vacuum envelope of the tube and as a result the tube is extremely rugged. The small mica window located in the wall of the cavity resonator which window forms a part of the vacuum envelope does not affect the structural ruggedness of the tube to any appreciable amount, yet affords an improved means for tuning the internal cavity by means of an external cavity coupled to the internal cavity at the window and for extracting high frequency energy from the internal cavity. Because this point of egress and ingress is small and mica, a low loss material, is sealed therein as a part of the vacuum envelope rather than glass, a high loss material, customarily used in the vacuum envelope, the tube is highly efficient.

Although the invention has been described with reference to a reflex klystron tube, it should be understood that this invention applies equally well to electron discharge devices in general as well as other types of velocity modulated tubes and may be embodied in other specific forms without departing from the spirit or essential characteristics thereof.

What is claimed is:

1. A high frequency tube structure comprising a body having a cylindrical bore, an electron gun assembly mounted in said body adapted to produce an electron beam directed axially within the bore of said body, a pair of ring-shaped walls mounted within the bore of said body in spaced apart relationship, the central apertures in said walls being axially aligned in the body in the path of the electron beam, a reentrant tube mounted on one of said ring-shaped walls and extending toward the other wall in axial alignment with the apertures in said walls, a first grid structure mounted in the aperture of said other wall, a second grid structure mounted on the end of said re-entrant tube near said other wall, said grid structures, the outer surface of said re-entrant tube, said ring-shaped walls, and the portion of said body between said walls combining to form a cavity resonator to which high frequency energy is delivered from said beam, said body having an aperture in the wall thereof between said ring-shaped walls, said aperture having a wave energy permeable material thereover sealed to said body, and means coupled to said body at said last named aperture for extracting wave energy from said cavity resonator.

2. A high frequency tube structure comprising a hollow cylindrical metallic body, an electron gun assembly mounted in said body for producing an electron beam directed axially within said body, a resonator cavity within said body in the path of said beam, said body forming the wall of said resonator cavity, said wall having an aperture therein extending less than one-half the circumferential distance around said wall, a sheet of mica covering said aperture and sealed to said body, a removable member forming a resonator cavity with an opening in one side thereof, said side being adapted to fit against said body on the outside thereof so that said opening coincides with said aperture, and means associated with said second resonator cavity for tuning said tube, said second resonator cavity having means for extracting wave energy from said resonator cavities.

3. A high frequency tube structure comprising a cylindrical metallic body, a cavity resonator portion within said body, said body forming the wall of said cavity resonator, said wall having an aperture therein extending less than one-half the circumferential distance around said wall, a sheet of wave permeable material covering said aperture and sealed to said body, a rectangular shaped metallic cavity resonator portion having one end thereof closed and the other end open, said open end being adapted to removably fit against said body on the outside thereof with said opening in coincidence with said aperture, said closed end of the external cavity resonator portion having an opening therein through which wave energy is extracted therefrom, and a tuning means associated with said external cavity resonator portion.

4. In combination, an electron discharge device comprising an evacuated body portion having a substantially cylindrical wall, the inside surface of the substantially cylindrical wall of the body portion serving to define an internal cavity resonator, said wall having a window opening therein sealed over with wave energy permeable material, a pair of ring members encircling the body portion, one member on either side of the window opening, an external cavity resonator portion adapted to fit the body portion over the window opening, the end surface of the external resonator portion conforming to the cylindrical surface of the wall of the body and engaging the two ring members, and means for drawing the end surface of the external cavity portion, the ring members and the wall of the body into a snug sealing junction.

5. The combination as claimed in claim 4 wherein the body portion is provided with a pair of shallow recesses encircling the body, one on either side of the window opening, into which the ring members fit and protrude therefrom.

6. An evacuated electron discharge device comprising cathode means adapted to produce a beam of electrons in said device, a reentrant cavity resonator including a side wall and means forming a resonator gap positioned in the beam path with the resonator gap therein aligned with the beam for interaction therewith, the cavity resonator having an iris opening in the side wall thereof, a wave energy permeable material vacuum sealed over the opening, a second cavity resonator adjoining said reentrant cavity resonator, an iris loading member overlaying said iris opening for heavily coupling said second cavity resonator to said re-entrant cavity resonator through said iris opening, and a movable capacitive tuning post mounted in said second cavity resonator for changing the resonance of said second cavity resonator and thus tuning said device.

7. A reflex klystron comprising cathode means adapted to produce an electron beam therein, a reflector electrode aligned with the cathode adapted to repel the electron beam, means forming a first cavity resonator having fixed dimensions defining a fixed tuned cavity positioned in the beam path between said cathode and reflector for interaction with the electron beam whereby radio frequency wave energy may be produced in said cavity resonator, said resonator having a window therein, means forming a second cavity resonator coupled to said first cavity resonator through said window, said second cavity resonator having an electrically conducting member therein overlaying said window for heavily coupling said second cavity resonator to said first cavity resonator whereby radio frequency wave energy interaction exists between the two cavity resonators, tuning means coupled to said second cavity resonator for varying the size thereof whereby said klystron may be tuned, and a wave energy permeable material vacuum sealed in said window between said first and second cavity resonators, said first cavity resonator being within the evacuated portion of the device and said second cavity resonator being outside said evacuated portion.

8. An evacuated electron discharge device comprising cathode means adapted to produce an electron beam therein, means forming a first cavity resonator positioned in the beam path for interaction with the electron beam, said cavity forming means having an iris opening in one side thereof, means forming a second cavity resonator heavily coupled electrically to said first cavity resonator at said iris opening, wave energy permeable material vacuum sealed between said first and said second cavity resonators, said first cavity resonator being within the evacuated portion of the device and said second cavity resonator being outside the evacuated portion, and an iris loading member disposed adjacent the iris opening for enhancing the electrical coupling between said first cavity resonator and said second cavity resonator.

9. An evacuated electron discharge device comprising means forming an internal resonator cavity, one of the walls of said internal resonator cavity forming a part of the vacuum envelope of said device, said one wall having an opening therein, a wave energy permeable material covering said opening, said material forming a part of the vacuum envelope of said device, means forming an external resonator cavity without the vacuum envelope of the device, said external resonator cavity being mounted adjoining said internal resonator cavity, an electrically conducting metallic member within said external resonator cavity spaced from and overlaying said wave energy permeable material for heavily coupling said internal resonator cavity through said covered opening to said external resonator cavity, and means associated with said external cavity for tuning the resonance of said external cavity and thus tuning said device.

10. An electron discharge device as claimed in claim 9 wherein said tuning means comprises a movable post in said external resonator cavity for changing the internal dimensions thereof.

References Cited in the file of this patent

UNITED STATES PATENTS

| | | |
|---|---|---|
| 2,391,016 | Ginzton et al. | Dec. 18, 1945 |
| 2,421,635 | McArthur | June 3, 1947 |
| 2,491,971 | Hall et al. | Dec. 20, 1949 |
| 2,517,731 | Sproull | Aug. 8, 1950 |
| 2,527,770 | Smith | Oct. 31, 1950 |
| 2,555,349 | Litton | June 5, 1951 |
| 2,658,147 | Bainbridge | Nov. 3, 1953 |
| 2,659,028 | Kyhl | Nov. 10, 1953 |